Aug. 23, 1938.   M. M. WEBSTER ET AL   2,127,636
HEAT INSULATOR
Filed May 12, 1936
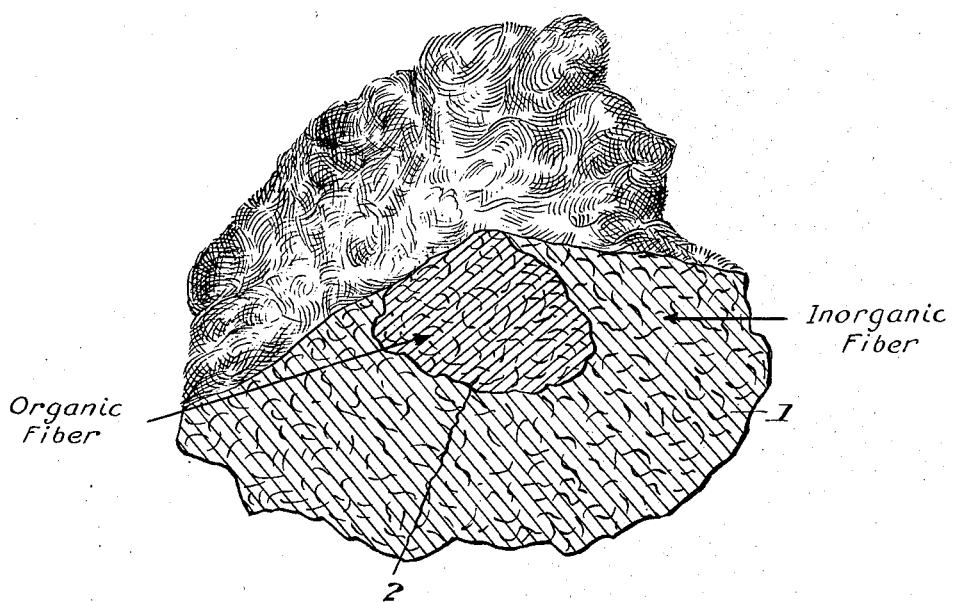
Inventor
Murrie M. Webster
Joseph L. Finck
By Geo. P. Kimmel
Attorney Patented Aug. 23, 1938

2,127,636

UNITED STATES PATENT OFFICE 2,127,636

HEAT INSULATOR

Murrie M. Webster, Washington, D. C., and Joseph L. Finck, New York, N. Y., assignors to American Asbestos Co. Inc., Baltimore, Md.

Application May 12, 1936. Serial No. 79,358

2 Claims. (Cl. 106—18)

This invention relates to a heat insulating material designed primarily for use in connection with and to provide the walls, floors and roofs of buildings with a non-heat conducting characteristic, but it is to be understood that an insulating material in accordance with this invention is to be employed in any connection for which it may be found applicable.

The object of the invention is to provide, in a manner as hereinafter set forth, an insulating material composed of unimpregnated units irregular in shape, size and formation and with each unit consisting of a core or carrier of a fibrous organic substance completely encased by a fibrous inorganic substance.

A further object of the invention is to provide an insulating material composed of unimpregnated composite units irregular in shape, size and formation and with each unit consisting of a core or carrier of a fibrous organic substance completely covered by a fibrous inorganic insulating substance whereby the resultant heterogeneous mixture has a thermal conductivity much lower than the original fibrous inorganic constituent.

A further object of the invention is to provide, in a manner as hereinafter set forth, an insulating material composed of unimpregnated units irregular in shape, size and formation and with each unit consisting of a core or carrier of a fibrous organic substance completely encased by a fibrous inorganic substance, and with the latter being of a materially greater percentage than that of the organic substance whereby if the core or carrier breaks into sections, such sections will be immediately encased or covered with free parts of the original casing or covering for such core thereby preventing the impairing of the insulating material in any manner.

Further objects of the invention are to provide, in a manner as hereinafter referred to, an unimpregnated insulating material which is unusually durable, readily applied in insulating position, thoroughly efficient in its use, and inexpensive to manufacture.

The drawing illustrates, by way of example and upon an enlarged scale a sectional elevation of one of the unimpregnated irregular shaped units of the insulating material in accordance with this invention.

Referring to the drawing 1 indicates a casing or covering for a core or carrier 2. The casing 1 is formed of a fibrous inorganic substance. The core 2 is formed of a fibrous organic substance. The percentage of the inorganic substance is materially greater than that of the percentage of the organic substance and is so shown.

The insulating material, in accordance with this invention consists of an inorganic fibrous substance such as asbestos, and a fibrous organic substance such as wood fibre. The percentage of the inorganic substance is greater by weight than that of the percentage of, by weight of the organic substance. Preferably the percentage of the inorganic substance will be 85% and that of the organic substance 15%. The wood fibre and the asbestos, in the desired proportions are subjected together to a cut and folded flight conveyor mixer to form a preliminary partly blended mixture. This mixture is then subjected to a cage type disintegrator to insure the complete blending of the asbestos with the fibre. The asbestos due to its inherent clinging ability with respect to itself and to the wood fibre will completely encase each fibre during the operation of mixing carried out by the cage type disintegrator. In the mixing steps, the organic substance becomes irregular in shape, size and formation and becomes completely covered or encased with the inorganic material whereby there is produced units of irregular shape, size and formation.

The organic material, subsequently, may break up into smaller parts but in each such break, the part of the organic material which becomes exposed at the point of the break, readily becomes covered with the free inorganic substance. In this way, there is no deterioration in the insulating material produced.

The material produced is composed of units irregular in shape, size and formation. Each of these units consists of a core or carrier 2 of an organic substance and a covering or casing 1 therefor of the inorganic substance, which, in the mixing process, has adhered to the organic substance or core.

The organic and inorganic substances do not fuse in the mixing, but in the mixing of them, they form an adhesive affinity for each other and their union is difficult of separation.

By mixing an inorganic substance with an organic substance to produce the units, the inorganic substance is lowered in density whereby the efficiency of the inorganic substance as an insulator is materially increased or in other words the thermal conductivity of the inorganic substance is decreased.

The material may be economically applied to the walls, floors, ceilings and roofs of buildings. The material in addition to its heat insulating characteristic also possesses a fire-resisting quality. When applied it automatically settles by gravity and forms a substantially solid filler, lining or covering.

As is well known an inorganic fibrous material, such as short fibered asbestos has little, if any commercial value, but by utilizing it as an element of the heat insulator, in accordance with this invention causes it to be a valuable commercial product.

What we claim is:

1. A loose insulating material which packs by gravity at the point of use, said material being formed of independent units irregular in shape, size and formation, each of said units consisting of a core formed from a non-impregnated organic fibre completely encased by a mass of non-impregnated clinging inorganic fibres, and a free mass of inorganic fibres, said organic fibres being wood fibre and said inorganic fibres being shredded asbestos, the percentage of the inorganic fibres being materially greater than that of the percentage of the organic fibres.

2. A loose insulating material which packs by gravity at the point of use, said material being formed of independent units irregular in shape, size and formation, each of said units consisting of a core formed from a non-impregnated organic fibre completely encased by a mass of non-impregnated clinging inorganic fibres, and a free mass of inorganic fibres, said organic fibres being wood fibre and said inorganic fibres being shredded asbestos, the percentage of the inorganic fibres being materially greater than that of the percentage of the organic fibres, said mass of inorganic fibres encasing an organic fibre having its density reduced when in encasing position.

MURRIE M. WEBSTER.
JOSEPH L. FINCK.